United States Patent
Malik et al.

(10) Patent No.: US 9,130,844 B1
(45) Date of Patent: Sep. 8, 2015

(54) SYSTEMS AND METHODS FOR HARVESTING EXCESS COMPUTE CAPACITY ACROSS DOMAINS

(71) Applicant: Citigroup Technology, Inc., Weehawken, NJ (US)

(72) Inventors: Imran Malik, Randolph, NJ (US); Scott Free, Jersey City, NJ (US); Rafael Brito, Belton, TX (US); Mohsin Jaffar, Bridgewater, NJ (US)

(73) Assignee: Citigroup Technology, Inc., Weehawken, NJ (US)

( * ) Notice: Subject to any disclaimer, the term of this patent is extended or adjusted under 35 U.S.C. 154(b) by 0 days.

(21) Appl. No.: 14/538,259

(22) Filed: Nov. 11, 2014

(51) Int. Cl.
- *G06F 15/173* (2006.01)
- *H04L 12/26* (2006.01)
- *H04L 12/911* (2013.01)

(52) U.S. Cl.
CPC ............ *H04L 43/0876* (2013.01); *H04L 47/70* (2013.01)

(58) Field of Classification Search
CPC .... H04L 43/0876; H04L 47/781; H04L 47/70
USPC ........................................................ 709/226
See application file for complete search history.

(56) References Cited

U.S. PATENT DOCUMENTS

| 7,406,691 | B2 * | 7/2008 | Fellenstein et al. | 709/226 |
|---|---|---|---|---|
| 8,209,415 | B2 | 6/2012 | Wei | |
| 8,346,909 | B2 * | 1/2013 | Dan et al. | 709/224 |
| 8,595,331 | B2 | 11/2013 | Henseler et al. | |
| 8,689,227 | B2 | 4/2014 | Blanding et al. | |
| 2001/0027484 | A1 * | 10/2001 | Nishi | 709/223 |
| 2004/0243699 | A1 | 12/2004 | Koclanes et al. | |
| 2009/0241117 | A1 | 9/2009 | Dasgupta et al. | |
| 2011/0126197 | A1 | 5/2011 | Larsen et al. | |
| 2012/0303407 | A1 | 11/2012 | Fong et al. | |
| 2014/0075005 | A1 | 3/2014 | Tung et al. | |

OTHER PUBLICATIONS

Chen, "Dynamic Capacity Provisioning of Server Farm," 28 pages, http://www.doc.ic.ac.uk/icep/presentations/yuan-chen-provisioning.pdf.
Stahl et al., "Performance and Capacity Themes for Cloud Computing," ibm.com/redbooks, Mar. 2013, 76 pages, http://www.redbooks.ibm.com/redpapers/pdfs/redp4876.pdf.

* cited by examiner

*Primary Examiner* — Phuoc Nguyen
(74) *Attorney, Agent, or Firm* — John M. Harrington, Esq.; Johnson, Marcou & Isaacs, LLC

(57) ABSTRACT

Systems and methods for harvesting excess compute capacity across different compute domains involve a monitoring engine that collects resource utilization data continuously in real time for each of a plurality of server nodes in each of a plurality of different compute domains via a network. An elastic compute workload management engine receives the collected resource utilization data from the monitoring engine via the network, extracts excess workload from one or more server nodes with excess workload demand in a first one of the plurality of different compute domains via the network and inserts the extracted excess workload into one or more server nodes with currently available compute capacity in a second one of the plurality of different compute domains via the network.

21 Claims, 2 Drawing Sheets

SYSTEMS AND METHODS FOR HARVESTING EXCESS COMPUTE CAPACITY ACROSS DOMAINS

FIELD OF THE INVENTION

The present invention relates generally to the field of compute capacity management, and more particularly to systems and methods for harvesting excess compute capacity across disparate compute domains.

BACKGROUND OF THE INVENTION

Currently, infrastructure servers of enterprise computing centers are typically configured as sets of nodes dedicated to a specific compute application. Such configurations create separate compute domains, such as a virtual desktop infrastructure (VDI) domain, a big data domain, a grid domain and a cloud domain, in which server nodes are locked into specific functions. Further, the domains in such configurations are often built to meet peak demand. Thus, the resources consumed by the current workload in a particular domain frequently leave excess capacity that is not utilized. At any given time, the greater the difference between peak and actual workload demand, the greater is the wasted capacity, which ultimately translates into higher costs.

There is a current need for a framework for harvesting excess compute cycle capacity across separate compute domains when it is not presently being utilized.

SUMMARY OF THE INVENTION

Embodiments of the invention employ computer hardware and software, including, without limitation, one or more processors coupled to memory and non-transitory computer-readable storage media with one or more executable programs stored thereon which instruct the processors to perform the harvesting of excess compute capacity across separate domains described herein. Embodiments of the invention may provide systems for harvesting excess compute capacity across disparate domains that may employ, for example, a network communicably coupled to each of a plurality of server nodes in a plurality of different compute domains; and a monitoring engine having a processor coupled to memory and being communicably coupled via the network to each of the server nodes in each of the plurality of different compute domains, the monitoring engine processor being programmed to collect resource utilization data continuously in real time for each of the plurality of server nodes in the plurality of different compute domains.

In addition, embodiments of the invention may employ, for example, an elastic compute workload management engine having a processor coupled to memory and being coupled via the network to the monitoring engine and to each of the server nodes in each of the plurality of different compute domains, the elastic compute workload management engine processor being programmed to receive, via the network, the collected resource utilization data for each server node in the plurality of different compute domains from the monitoring engine processor; extract, via the network, excess workload from at least one server node with excess workload demand in a first one of the plurality of different compute domains; and insert, via the network, the extracted excess workload into at least one server node with presently available compute capacity in a second one of the plurality of different compute domains.

In aspects of embodiments of the invention, the network may comprise a high-speed, deterministic network, an ultra-low latency network, and/or a network switch architecture with no network server nodes more than two hops apart. Other aspects may employ, for example, at least one domain workload management engine in at least one of the plurality of different compute domains integrated with the elastic compute workload management engine. Further aspects may employ, for example, a node monitoring agent deployed on at least one of the plurality of server nodes in at least one of the plurality of different compute domains In additional aspects of embodiments of the invention, the elastic compute workload management engine processor may be further programmed, for example, to determine currently available compute capacity or excess workload demand for each server node in each in the plurality of different compute domains based on the collected resource utilization data for each server node in the plurality of different compute domains. In still other aspects, the elastic compute workload management engine processor may be further programmed, for example, to identify the at least one server node with excess workload demand in the first one of the plurality of different compute domains. In still further aspects, the elastic compute workload management engine processor may be further programmed, for example, to identify the at least one server node with presently available compute capacity in the second one of the plurality of different compute domains.

Embodiments of the invention may also provide methods for harvesting excess compute capacity across separate domains that may involve, for example, collecting, by a monitoring engine having a processor coupled to memory, resource utilization data continuously in real time for each of a plurality of server nodes in each of a plurality of different compute domains via a network; receiving, by an elastic compute workload management engine having a processor coupled to memory, the collected resource utilization data for each server node in the plurality of different compute domains from the monitoring component engine processor via the network; extracting, by the elastic compute workload management engine processor, excess workload from at least one server node with excess workload demand in a first one of the plurality of different compute domains via the network; and inserting, by the elastic compute workload management engine processor, the extracted excess workload into at least one server node with presently available compute capacity in a second one of the plurality of different compute domains via the network.

In aspects of embodiments of the invention, the network may comprise, for example, a high-speed, deterministic, ultra-low latency network and/or a network switch architecture with no network servers more than two hops apart. In other aspects, collecting the resource utilization data may involve, for example, collecting the resource utilization data at least in part from a node monitoring agent on at least one of the plurality of server nodes in at least one of the plurality of different compute domains. In further aspects, collecting the resource utilization data may involve, for example, collecting the resource utilization data at least in part from a domain workload management engine in at least one of the plurality of different compute domains integrated with the elastic compute workload management engine. In additional aspects, receiving the collected resource utilization data may involve, for example, determining a degree of currently available compute capacity and excess workload demand for each server node in each of the plurality of different compute domains.

In other aspects of embodiments of the invention, extracting the excess workload may involve, for example, identifying the at least one server node with excess workload demand in the first one of the plurality of different compute domains.

In further aspects, inserting the extracted excess workload may involve, for example, identifying the at least one server node with presently available compute capacity in a second one of the plurality of different compute domains. In additional aspects, inserting the extracted excess workload may involve, for example, inserting the extracted excess workload into a purposed software receptacle of the at least one server node with presently available compute capacity in the second one of the plurality of different compute domains. In still further aspects, inserting the extracted excess workload may involve, for example, inserting the extracted excess workload into an operating system of the at least one server node with presently available compute capacity in the second one of the plurality of different compute domains. Still other aspects may involve, for example, extracting at least a portion of the inserted workload from the at least one server node in the second one of the plurality of different compute domains when the at least one server node in the second one of the plurality of different compute domains no longer has sufficient available compute capacity for the workload.

These and other aspects of the invention will be set forth in part in the description which follows and in part will become more apparent to those skilled in the art upon examination of the following or may be learned from practice of the invention. It is intended that all such aspects are to be included within this description, are to be within the scope of the present invention, and are to be protected by the accompanying claims.

DETAILED DESCRIPTION

Reference will now be made in detail to embodiments of the invention, one or more examples of which are illustrated in the accompanying drawings. Each example is provided by way of explanation of the invention, not as a limitation of the invention. It will be apparent to those skilled in the art that various modifications and variations can be made in the present invention without departing from the scope or spirit of the invention. For example, features illustrated or described as part of one embodiment can be used in another embodiment to yield a still further embodiment. Thus, it is intended that the present invention cover such modifications and variations that come within the scope of the invention.

Embodiments of the invention provide a framework that solves a long existing problem found in traditional compute domains, such as VDI, and especially in newer, larger compute domains, such as big data and cloud, that results from the manner in which such domains are constructed. These domains are necessarily designed in a way that is intended to satisfy a peak application demand. Such design results in excess compute capacity in each domain, because the peak demand capacity is not always completely saturated at every point in time. This design feature provides a currently unexploited opportunity to harvest excess compute cycle availability across different domains.

Embodiments of the invention provide a framework that enables a shifting of workload in real-time across disparate compute domains to utilize currently available capacity. According to embodiments of the invention, excess workload demand in one domain at any given time may run on excess compute capacity in other domains, more efficiently utilizing existing enterprise resources. Accounting for the use of this previously untapped capacity has an effect of lowering costs by reducing a need for net new infrastructure spending as enterprise demand increases.

Embodiments of the invention provide an understanding in real time of excess compute capacity that may exist, for example, in a variety of disparate compute domains within one or more data centers and seamless scheduling in real time of any workload that may benefit from harvesting the excess capacity. An aspect of embodiments of the invention may involve, for example, instrumenting real-time analytics onto a resource monitoring engine. Other aspects of embodiments of the invention may involve, for example, integrating the monitoring engine with a scheduling engine to generate real-time decisions. Further aspects may involve, for example, building heuristics into the scheduling logic to place a given workload across some or many compute domains that may typically be included in data centers.

Figure 1:
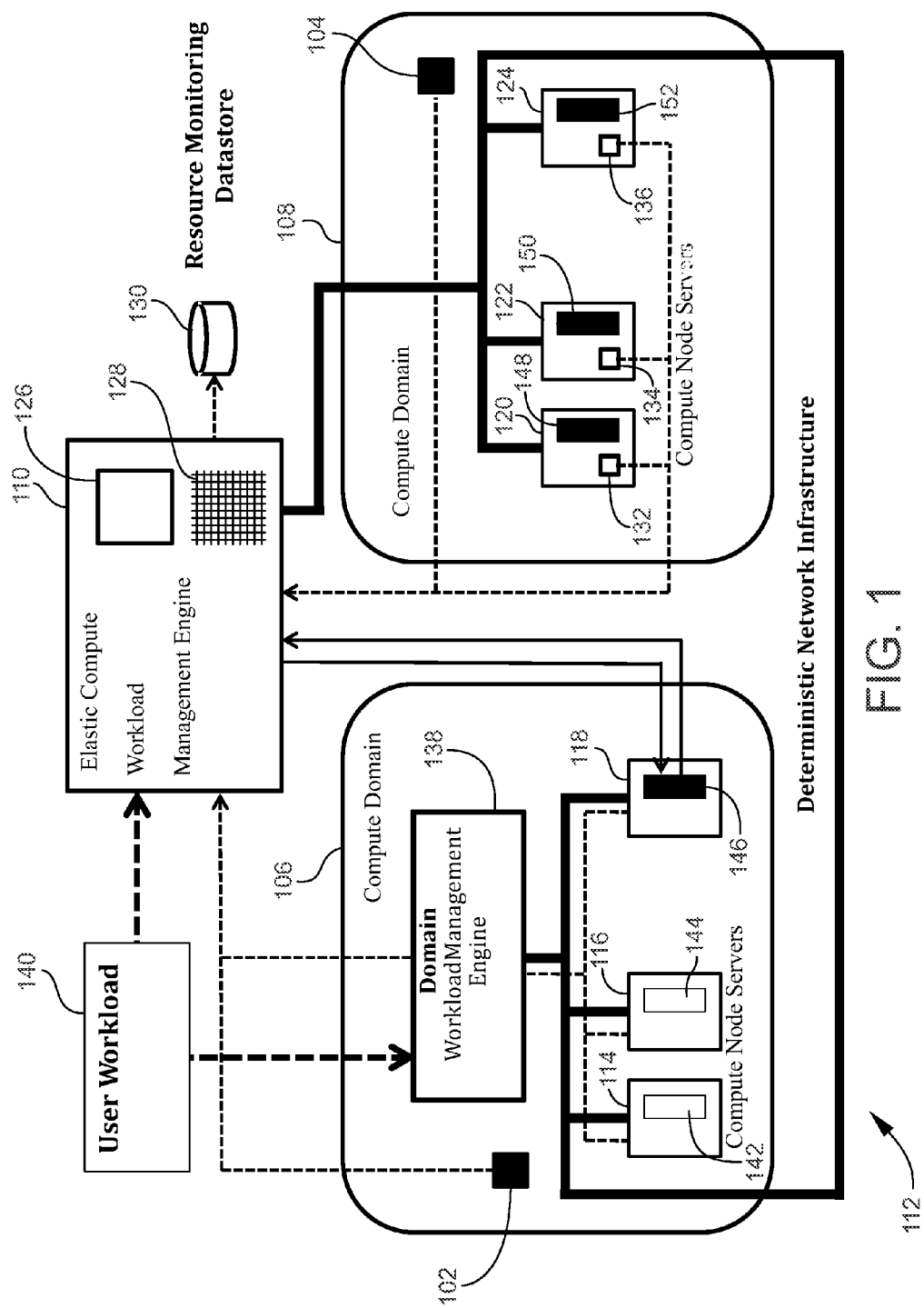
FIG. 1 is a schematic diagram that illustrates an overview example of components and the flow of information between components of the system for harvesting excess compute capacity across different compute domains of embodiments of the invention.

FIG. 1 is a schematic diagram that illustrates an overview example of components and the flow of information between components of the system for embodiments of the invention. Referring to FIG. 1, significant components may include, for example, a real-time resource monitoring component 102, 104 in compute domains 106, 108, respectively, an elastic compute workload management engine 110, and a deterministic network infrastructure 112. The real-time monitoring component 102, 104 may provide resource utilization data continuously across a plurality of disparate compute domains, such as compute domains 106, 108, to the elastic compute workload management engine 110. It is to be understood that while only two compute domains 106, 108 are shown in FIG. 1, embodiments of the invention may be deployed for any number of compute domains.

The high-speed, deterministic network infrastructure 112 for embodiments of the invention delivers real-time monitoring data, maintains synchronization of resource utilization state across the plurality of compute domains 106, 108 and their respective server nodes 114, 116, 118 and 120, 122, 124, and efficiently executes workload across compute domains. Examples of suitable high-speed, deterministic network architectures may include ARISTA® or CISCO IP® fabric in leaf/spine architecture. It is to be understood that the foregoing reference to particular network architectures is exemplary only and that embodiments of the invention are not limited to employment of any particular network architecture.

In addition, the elastic compute workload management engine 110 for embodiments of the invention may include, for example, computer logic comprising predetermined resource utilization policies 126 and predefined scheduling algorithms, analytics, and rule sets 128. Further, the elastic compute workload management engine 110 may have an associated resource monitoring datastore 130 in the form, for example, of a relational database storing resource monitoring data for historical analysis and reporting. The resource monitoring datastore 130 may also provide a feedback loop into the elastic compute workload management engine 110 to build heuristics for improved scheduling decisions. Examples of a suitable resource monitoring datastore may include HP VERTICA® and/or ORACLE®. It is to be understood, however, that the reference to a particular database is exemplary only and that embodiments of the invention are not limited to any particular database In embodiments of the invention, the real-time resource monitoring component 102, 104 measures a current consumption of compute resources, such as central processing unit (CPU), memory, storage, input/output (I/O) and network, across server nodes in each domain 106, 108 and its associated network and storage infrastructure and determines an available compute opportunity at any given time. Thus, the real-time resource monitoring component 102, 104 provides the underlying data necessary to continuously make intelligent workload scheduling decisions as resource availability in each compute domain 106, 108 changes over time.

The framework for embodiments of the invention understands the CPU, memory, storage, and I/O network intricacies within the data center, and calculates real-time metrics before a scheduling decision is made. Thus, embodiments of the invention enable aggregation of traditionally separate compute domains or subcomponents within the compute domains, to perform a real-time assessment that may be characterized as creating a bitmap of where an opportunity lies and which compute domain or domains within a data center should be avoided based on a given level of utilization at a particular moment in time.

The framework for embodiments of the invention may extend the functionality of a scheduler, such as a grid scheduler, and integrate disparate compute workloads within a scheduler framework. A significant aspect of embodiments of the invention is the elastic compute workload management engine 110 that further extends the functionality of the scheduler by integrating the real-time resource monitoring component 102, 104 and adding intelligence to the elastic compute workload management engine 110. The data for continuously making intelligent workload scheduling decisions may be delivered over the deterministic network infrastructure 112 to the elastic compute workload management engine 110 for use and also stored in the resource monitoring datastore 130 for historical analysis and reporting.

In embodiments of the invention, at least one of the plurality of compute domains, such as compute domain 108, may employ one or more compute node monitoring agents 132, 134, and 136 for its server nodes 120, 122, and 124, respectively, to provide server data in real time over the deterministic network infrastructure 112. Such agents may extend and integrate any compute target, for example, into the framework of a domain, such as a grid domain. Examples of compute node monitoring agents may include IBM® PLATFORM SYMPHONY®, ADAPTIVE COMPUTING®, UNIVA GRID ENGINE®, and/or APACHE MESOS®. It is to be understood, however, that the foregoing reference to particular compute node monitoring agents is exemplary only and that embodiments of the invention are not limited to any particular compute node monitoring agents.

In embodiments of the invention, monitoring may be performed directly using the agents 132, 134, and 136 deployed on each compute node 120, 122, and 124 or indirectly through other software that already monitors specific nodes or compute domains. For the latter cases, monitoring for embodiments of the invention may be integrated with monitoring that is already performed by such other software. As noted, infrastructure monitoring components 102, 104 may be included, for example, in compute domains 106, 108, respectively, to provide data on infrastructure utilization in real time over the deterministic IP network 112 to the elastic compute workload management engine 110. Examples of infrastructure monitoring components may include integration of the elastic compute capacity management engine 110 with monitoring tools such as BMC PERFORMANCE ASSURANCE®, CIRBA®, and/or VMWARE VCENTER®. It is to be understood, however, that the foregoing reference to particular monitoring tools is exemplary only and that embodiments of the invention are not limited to any particular monitoring tools.

Embodiments of the invention may rely on the high-speed, deterministic network infrastructure 112 to deliver monitoring data in real-time, to maintain synchronization of resource utilization states across all compute domains and their server nodes, and to efficiently execute workload across compute domains. For example, a scheduler may be integrated with the deterministic network IP fabric 112 that guarantees an ultra-short machine-to-machine (M2M) latency profile of not greater than five microseconds as a significant feature of embodiments of the invention. Modern network mesh topologies that flatten the network and minimize the number of hops between any two nodes may be preferable to provide deterministic inter-node communication.

The deterministic network infrastructure 112 for embodiments of the invention may provide ultra-low latency and highly deterministic performance within a compute domain and across compute domains, such as between a grid infrastructure and VDI, big data or cloud domains. This ultra-low latency may be accomplished, for example, by employing a network switch architecture in which no two servers are more than two hops away from one another. An example of an ultra-low network architecture may be an ARISTA® mesh of network switches architected in a way that delivers an ultra-low latency profile. In embodiments of the invention, logic of the deterministic network infrastructure and the real-time monitoring engine component may be integrated into a workload scheduler component. It is to be understood, however, that the foregoing reference to a particular network architecture is exemplary only and that embodiments of the invention are not limited to any particular network architecture.

In embodiments of the invention, the logic of the grid domain framework may be extended with monitoring capabilities and integrated with monitoring feeds of ultra-low network architecture switches brought in from distributed storage of a high-performance clustered file system, such as a file system based on GENERAL PARALLEL FILE SYSTEM (GPFS)®. Those elements may also be integrated into the monitoring framework for embodiments of the invention, a current consumption of compute resources, such as central processing unit (CPU), memory, storage, input/output (I/O) and network, across server nodes in each domain and the associated network and storage infrastructure may be measured, and a decision may be made if and when to harvest available excess compute cycles. It is to be understood that the foregoing reference to a particular file system is exemplary only and that embodiments of the invention are not limited to any particular file system.

Embodiments of the invention may run workload across disparate compute domains through the elastic compute workload management engine 110. The elastic compute workload management engine 110 may comprise software executing on one or more processors which performs a number of tasks. For example, the elastic compute workload management engine 110 may identify workload to be run, receive real-time resource utilization data from all server nodes and associated infrastructure, and measure currently unused compute capacity for each node in one or more domains. In addition, the elastic compute workload management engine 110 may make intelligent workload scheduling decisions based on the currently available capacity and in accordance with configurable resource utilization policies, insert workload for execution into one or more specific server node(s) with sufficient available capacity, extract workload from one or more nodes when the available capacity for the one or more nodes becomes no longer sufficient to accommodate that workload, and reschedule workload on one or more other nodes with currently available capacity.

The elastic compute workload management engine 110 for embodiments of the invention may manage workload that is submitted directly to the engine, either by other software or users, or indirectly by other workload management software with which the engine may be integrated, of which the engine is given knowledge, and to which the engine is given management access for that other workload. These other workload managers may schedule workload for and within a specific domain. For example, at least one of the plurality of compute domains, such as compute domain 106, may include a domain workload management engine 138 integrated with the elastic compute workload management engine 110 to provide data collected, for example, from server nodes 114, 116, 118 in the particular domain 106. An example of a domain workload management engine may include IBM® PLATFORM SYMPHONY®. However, it is to be understood that the foregoing reference to a particular domain workload management engine is exemplary only and that embodiments of the invention are not limited to any particular a domain workload management engine.

In embodiments of the invention, enterprise users may provide user workload 140 to the elastic compute workload management engine 110 and/or domain workload management engine 138. The elastic compute workload management engine 110 may identify one or more compute nodes with available resource capacity. The elastic compute workload management engine 110 may then make intelligent scheduling decisions based on currently available capacity using the scheduling algorithms, analytics, and rule sets 128 in accordance with the configurable resource utilization policies 126. The data feeds may be fed into the monitoring engine 102, 104 and subsequently made available to a workload scheduler function of the elastic compute workload management engine 110.

It is not necessary for all workload within an enterprise to be under the control of the elastic compute workload management engine 110 for embodiments of the invention. For workload submitted directly to run on specific server nodes, which may be characterized as "native" workload, or submitted through software with which the elastic compute workload management engine 110 is not integrated, the elastic compute workload management engine 110 for embodiments of the invention may ensure that any workload inserted on these nodes coexists with this "native" workload, and may utilize only leftover resource capacity as determined through real-time monitoring of these nodes.

The elastic compute workload management engine 110 for embodiments of the invention may make scheduling decisions based on its real-time view of compute resources provided by the monitoring data received. The elastic compute workload management engine 110 may employ predefined algorithms, analytics, rule sets, historical data or other means to optimize resource utilization over the enterprise or for a particular compute domain. The elastic compute workload management engine 110 may also work in concert with certain other workload management software for specific workloads or compute domains with which it may be integrated. Scheduling decisions may also be made by the elastic compute workload management engine 110 in accordance with configurable resource utilization policies that provide additional priorities and constraints as deemed appropriate by the enterprise. When taken together, the elastic compute workload management engine 110 provides the means to intelligently schedule workload in real-time across nodes with currently available capacity subject to the objectives and constraints of the enterprise.

When the elastic compute workload management engine 110 for embodiments of the invention identifies workload demand requiring resources and the currently available capacity exists on one or more server nodes in one or more compute domains, the engine 110 may make a decision to insert workload on those one or more server nodes with currently available capacity. Some or all of the server nodes 114, 116, 118, 120, 122, 124 may be provided with purposed software receptacles 142, 144, 146, 148, 150, 152, respectively, into which workload may be inserted. The workload may be inserted by the elastic compute workload management engine 110 to run directly under the operating system on these nodes, or the workload may be inserted into the purposed software receptacles 142, 144, 146, 148, 150, 152 already available on these nodes.

As noted, in embodiments of the invention, workload may be inserted either into the purposed software receptacles 142, 144, 146, 148, 150, 152 or directly to the operating systems on one or more of the server nodes 114, 116, 118, 120, 122, 124 with currently available capacity. Examples of such purposed software receptacles may include VMWARE®/KVM GUEST® and/or DOCKER CONTAINERS®, and examples of such operating systems may include RED HAT® LINUX®, or MICROSOFT WINDOWS®. It is to be understood, however, that the foregoing reference to particular purposed software receptacles and operating systems is exemplary only and that embodiments of the invention are not limited to employment of any particular purposed software receptacles and/or operating systems. If native workload demand rises sufficiently as to require capacity currently consumed by inserted workloads, the elastic compute workload management engine 110 may extract the previously inserted workload and schedule it on other currently available resources, based on real-time metrics provided from the monitoring engine 102, 104.

In embodiments of the invention, purposed software receptacles 142, 144, 146, 148, 150, 152 may allow the elastic compute workload management engine 110 to isolate workloads and individually manage the resources available to each. A variety of technologies may be currently available create to such receptacles, such as virtual machines, control groups, cgroups, and containers. When purposed software receptacles 142, 144, 146, 148, 150, 152 are deployed in conjunction with the elastic compute workload management engine 110 for embodiments of the invention, such software receptacles may provide a way to manage and optimize resource utilization across different workloads.

In embodiments of the invention, when inserted workload is running, the real-time resource monitoring engine 102, 104 may continue to assess the resource utilization both for inserted workload and native workload. On occasion, the native workload demand for resources may increase to a point at which the resources currently being consumed by inserted workload may be needed to satisfy the demand of the native workload. In that case, since the native workload is not under control of the elastic compute workload resource management engine 110, the management engine 110 may make a decision to extract workload that was previously inserted. The means for this extraction may be a use of predefined algorithms 128 and/or configurable policies 126 to manage the transition of resources in accordance with the objectives and priorities of the enterprise. The transition may be as smooth or as abrupt as the enterprise may require. The extracted workload may then be requeued for scheduling on other currently available resources.

A use case example of deployment of embodiments of the invention may enable the scheduling of excess workload demand in a grid domain on available capacity in a VDI domain. The elastic compute workload management engine 110 may be deployed, for example, for grid scheduling and integrated with cluster management software in the VDI domain to enable real-time monitoring of VDI cluster-level and node-level utilization metrics. Algorithms may be specified and policies may be defined in the elastic compute workload management engine 110 to allow scheduling of grid domain tasks on dedicated grid-enabled virtual servers (referred to herein as "receptacles") as nodes available in the VDI domain. When there is excess grid domain workload demand for certain applications, and when the resource utilization of the VDI cluster drops below a configurable value, the elastic compute workload management engine 110 may insert grid tasks into the grid-enabled virtual servers for execution.

In embodiments of the invention, both the order and rate of insertion may be controlled algorithmically by the workload management engine 110 based on the real-time node-level utilization. As resource monitoring continues, if the cluster-level utilization rises above a second configurable value, the elastic compute workload management engine 110 may begin to extract the previously inserted workload. Again, the order and rate of extraction may be controlled algorithmically by the elastic compute workload management engine 110. The process of the present example may continuously utilize excess available capacity in the VDI domain to satisfy excess workload demand in the grid domain. It is to be understood that the foregoing use case is exemplary only and that embodiments of the invention enable the shifting of workload in real-time across disparate compute domains of any and all domain types in order to utilize currently available compute capacity.

An example of software that may be used as a native grid scheduler may be the IBM® PLATFORM SYMPHONY® software. For example, one or more other workload schedulers may be integrated into the data environments, such as big data environments or any other data environment. However, it is to be understood that embodiments of the invention are not limited to employment of such native grid scheduler or to employment of native grid domain schedulers in general.

Figure 2:
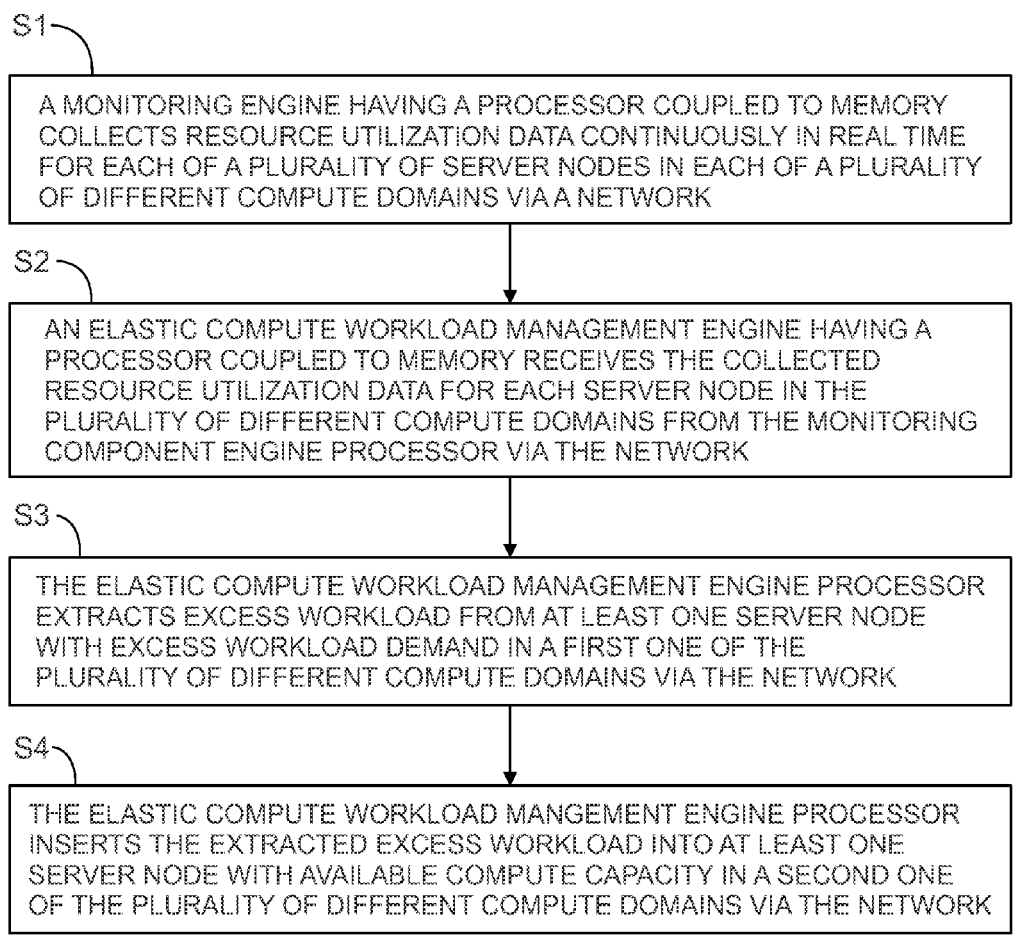
FIG. 2 is a flow chart that illustrates an example of the process of harvesting excess compute capacity across different compute domains for embodiments of the invention.

FIG. 2 is a flow chart that illustrates an example of the process of harvesting excess compute capacity across different compute domains for embodiments of the invention. Referring to FIG. 2, at S1, resource utilization data may be collected by monitoring engine 102, 104 continuously in real time for each of a plurality of server nodes 114, 116, 118 and 120, 122, 124 in each of a plurality of different compute domains 106 and 108, respectively, via a network 112. At S2, the collected resource utilization data for each server node in the plurality of different compute domains may be received by elastic compute workload management engine 110 from the monitoring component engine 102, 104 via the network 112. At S3, the elastic compute workload management engine 110 may extract excess workload from at least one server node, such as server node 118, with excess workload demand in a first one of the plurality of different compute domains, such as compute domain 106, via the network 112. At S4, the elastic compute workload management engine 110 may insert the extracted excess workload into at least one server node, such as server node 120, with available compute capacity in a second one of the plurality of different compute domains, such as compute domain 108, via the network 112.

Embodiments of the invention may employ server hardware, such as HEWLETT-PACKARD® and/or IBM® servers, using internal drives to create a distributed file system, such as the GPFS® component. As noted, embodiments of the invention may also employ network hardware, such as network architecture based on the ARISTA® networking technology. Embodiments of the invention may also employ, for example, an X86-based server which may use INTEL® processors and/or AMD® processors. Alternatively, embodiments of the invention may employ, for example, other X86-based hardware servers, such as ODM® or SUPER MICRO®. It is to be understood, however, that the foregoing references to particular server, networking, or file system hardware components are examples only and that embodiments of the invention are not limited to any particular server, network, or file system components.

As also noted, embodiments of the invention may employ management software, such as IBM® PLATFORM SYMPHONY® as a scheduler together with, for example, with an add-on, such as IBM® PLATFORM ANALYTICS®, as a foundation for real-time monitoring analytics. Such employment may enable data feeds to be received from non-IBM® non-grid specific sources, such as a network architecture based on ARISTA® networking technology. Data feeds may also be received from other areas within a data center. It is likewise to be understood that the foregoing references to particular scheduler, analytic, and network components are examples only and that embodiments of the invention are not limited to any particular scheduler, analytic, and network components.

In embodiments of the invention, other software, such as an add-on component, may be employed, for example, to integrate a monitoring framework with VDI infrastructure. The monitoring capability elements for embodiments of the invention may take the networking data feeds to understand any I/O saturation along the I/O path. Further, certain intelligence may be enabled for the scheduler to make or not make certain scheduling decisions, and the storage component may be performed, for example, in GPFS® file systems. Alternative embodiments may employ, for example, an open source scheduler instead of IBM® PLATFORM SYMPHONY® technology. Thus, alternative embodiments may employ a scheduler, such as a MOAB® scheduler. In that case, the framework for embodiments of the invention may be scheduler agnostic. It is to be further understood that the foregoing reference to a particular open source scheduler component is an example only and that embodiments of the invention are not limited to any particular open source scheduler component.

It is also to be understood that embodiments of the invention may be implemented as processes of a computer program product, each process of which is operable on one or more processors either alone on a single physical platform, such as a single computer, or across a plurality of platforms, such as a system or network, including networks such as the Internet, an intranet, a WAN, a LAN, a cellular network, or any other suitable network. Embodiments of the invention may employ client devices that may each comprise a computer-readable medium, including but not limited to, random access memory (RAM) coupled to a processor. The processor may execute computer-executable program instructions stored in memory. Such processors may include, but are not limited to, a microprocessor, an application specific integrated circuit (ASIC), and or state machines. Such processors may comprise, or may be in communication with, media, such as computer-readable media, which stores instructions that, when executed by the processor, cause the processor to perform one or more of the steps described herein.

It is also to be understood that such computer-readable media may include, but are not limited to, electronic, optical, magnetic, RFID, or other storage or transmission device capable of providing a processor with computer-readable instructions. Other examples of suitable media include, but are not limited to, CD-ROM, DVD, magnetic disk, memory chip, ROM, RAM, ASIC, a configured processor, optical media, magnetic media, or any other suitable medium from which a computer processor can read instructions. Embodiments of the invention may employ other forms of such computer-readable media to transmit or carry instructions to a computer, including a router, private or public network, or other transmission device or channel, both wired or wireless. Such instructions may comprise code from any suitable computer programming language including, without limitation, C, C++, C#, Visual Basic, Java, Python, Perl, and JavaScript.

It is to be further understood that client devices that may be employed by embodiments of the invention may also comprise a number of external or internal devices, such as a mouse, a CD-ROM, DVD, keyboard, display, or other input or output devices. In general such client devices may be any suitable type of processor-based platform that is connected to a network and that interacts with one or more application programs and may operate on any suitable operating system. Server devices may also be coupled to the network and, similarly to client devices, such server devices may comprise a processor coupled to a computer-readable medium, such as a random access memory (RAM). Such server devices, which may be a single computer system, may also be implemented as a network of computer processors. Examples of such server devices are servers, mainframe computers, networked computers, a processor-based device, and similar types of systems and devices.

What is claimed is:

1. A system, comprising:
   a network communicably coupled to each of a plurality of server nodes in a plurality of different compute domains;
   a monitoring engine having a processor coupled to memory and being communicably coupled via the network to each of the server nodes in each of the plurality of different compute domains, the monitoring engine processor being programmed to collect resource utilization data continuously in real time for each of the plurality of server nodes in the plurality of different compute domains; and
   an elastic compute workload management engine having a processor coupled to memory and being coupled via the network to the monitoring agent and to each of the server nods in each of the plurality of different compute domains, the elastic compute workload management engine processor being programmed to receive, via the network, the collected resource utilization data for each server node in the plurality of different compute domains from the monitoring engine processor; extract, via the network, excess workload from at least one server node with excess workload demand in a first one of the plurality of different compute domains based solely on a determination that the at least one server node in the first one of the plurality of different compute domains has insufficient currently available capacity to accommodate said excess workload; and insert, via the network, the extracted excess workload into at least one server node with available compute capacity in a second one of the plurality of different compute domains based solely on a determination that the at least one server node in the second one of the plurality of different compute domains has sufficient currently available unused capacity to accommodate said excess workload.

2. The system of claim 1, wherein the network comprises a high-speed, deterministic network.

3. The system of claim 1, wherein the network comprises an ultra-low latency network.

4. The system of claim 1, wherein the network comprises a network switch architecture with no network server nodes more than two hops apart.

5. The system of claim 1, further comprising at least one domain workload management engine in at least one of the plurality of different compute domains integrated with the elastic compute workload management engine.

6. The system of claim 1, further comprising a node monitoring agent deployed on at least one of the plurality of server nodes in at least one of the plurality of different compute domains.

7. The system of claim 1, the elastic compute workload management engine processor being further programmed to determine currently available compute capacity for each server node in each in the plurality of different compute domains based on the collected resource utilization data for each server node in the plurality of different compute domains.

8. The system of claim 7, the elastic compute workload management engine processor being further programmed to identify the at least one server node with excess workload demand in the first one of the plurality of different compute domains.

9. The system of claim 7, the elastic compute workload management engine processor being further programmed to identify the at least one server node with available compute capacity in the second one of the plurality of different compute domains.

10. A method, comprising:
    collecting, by a monitoring engine having a processor coupled to memory, resource utilization data continuously in real time for each of a plurality of server nodes in each of a plurality of different compute domains via a network;
    receiving, by an elastic compute workload management engine having a processor coupled to memory, the collected resource utilization data for each server node in the plurality of different compute domains from the monitoring component engine processor via the network;
    extracting, by the elastic compute workload management engine processor, excess workload from at least one server node with excess workload demand in a first one of the plurality of different compute domains via the network based solely on a determination that the at least one server node in the first one of the plurality of different compute domains has insufficient currently available capacity to accommodate said excess workload; and
    inserting, by the elastic compute workload management engine processor, the extracted excess workload into at least one server node with available compute capacity in a second one of the plurality of different compute domains via the network based solely on a determination that the at least one server node in the second one of the plurality of different compute domains has sufficient currently available unused capacity to accommodate said excess workload.

11. The method of claim 10, wherein the network comprises a high-speed, deterministic network.

12. The method of claim 10, wherein the network comprises an ultra-low latency network.

13. The method of claim 10, wherein the network comprises a network switch architecture with no network servers more than of two hops apart.

14. The method of claim 10, wherein collecting the resource utilization data further comprises collecting the resource utilization data at least in part from a node monitoring agent on at least one of the plurality of server nodes in at least one of the plurality of different compute domains.

15. The method of claim 10, wherein collecting the resource utilization data further comprises collecting the resource utilization data at least in part from a domain workload management engine in at least one of the plurality of different compute domains integrated with the elastic compute workload management engine.

16. The method of claim 10, wherein receiving the collected resource utilization data further comprises determining currently available compute capacity or excess workload demand for each server node in each in the plurality of different compute domains.

17. The method of claim 10, wherein extracting the excess workload further comprises identifying the at least one server node with excess workload demand in the first one of the plurality of different compute domains.

18. The method of claim 10, wherein inserting the extracted excess workload further comprising identifying the at least one server node with available compute capacity in a second one of the plurality of different compute domains.

19. The method of claim 10, wherein inserting the extracted excess workload further comprises inserting the extracted excess workload into a purposed software receptacle of the at least one server node with available compute capacity in the second one of the plurality of different compute domains.

20. The method of claim 10, wherein inserting the extracted excess workload further comprises inserting the extracted excess workload into an operating system of the at least one server node with available compute capacity in the second one of the plurality of different compute domains.

21. The method of claim 10, further comprising extracting at least a portion of the inserted workload from the at least one server node in the second one of the plurality of different compute domains when the at least one server node in the second one of the plurality of different compute domains no longer has sufficient compute capacity for the workload.

\* \* \* \* \*